United States Patent [19]

Witt, Jr. et al.

[11] Patent Number: 4,563,357

[45] Date of Patent: Jan. 7, 1986

[54] MODIFICATION OF SOY ISOLATE

[75] Inventors: Paul R. Witt, Jr.; Pamela A. Krone, both of Muscatine, Iowa

[73] Assignee: Grain Processing Corporation, Muscatine, Iowa

[21] Appl. No.: 516,940

[22] Filed: Jul. 25, 1983

[51] Int. Cl.$^4$ ............................................... A23L 1/20
[52] U.S. Cl. ..................................................... 426/46
[58] Field of Search ........................................ 426/46

[56] References Cited

U.S. PATENT DOCUMENTS

| | | | |
|---|---|---|---|
| 3,966,971 | 6/1976 | Morehouse et al. | 426/46 |
| 4,129,664 | 12/1978 | Kruseman et al. | 426/46 |
| 4,302,473 | 11/1981 | Mikami et al. | 426/46 |
| 4,376,128 | 3/1983 | Lunde | 426/46 |
| 4,443,540 | 3/1984 | Chervan et al. | 426/46 |

*Primary Examiner*—Sam Rosen
*Attorney, Agent, or Firm*—Neuman, Williams, Anderson & Olson

[57] ABSTRACT

Isoelectrically precipitated soy isolate is treated with a plant protease at a temperature of 70° to 85° C. to accomplish thinning or reduction of viscosity.

11 Claims, No Drawings

MODIFICATION OF SOY ISOLATE

This invention relates to the production of high purity protein from vegetable protein materials.

Soybeans are widely used to produce soy protein and a number of processes are known to obtain soy protein of varying degrees of purity. A large number of food applications require the use of soy isolate, that is, soy protein of at least 90% protein content. For example, infant formulae and other simulated milk products require a protein which will not result in excessive thickening or settling of the product with time. Soy isolate is frequently used in such products. In order to avoid the tendency of soy isolate to gel, isolates may be enzyme-hydrolyzed prior to use in this type of product. Such enzymatic hydrolysis generally requires periods in excess of 30 minutes at temperatures of 50°–60° C. These conditions are conducive to microbial growth. Moreover, enzymatic hydrolysis of soy protein material often results in production of bitter peptides and some of the enzymes used, such as pepsin and acid or alkaline proteases, require that the pH be adjusted away from neutrality and then back, which often results in increasing the salt content of the product.

Conventionally, soy protein isolates are obtained by precipitating the protein from a solution by adjusting the pH to the isoelectric pH, generally a pH of 4.5 to 5.0, at which the soy protein precipitates. Usually the precipitated curd is then resolubilized in water by adjusting the pH upwardly to pH 7.0–7.5 with an alkali. This step not only solubilizes the protein, but restores important properties of functionality such as oil or water absorption or whipping properties. High viscosity as the pH is increased toward neutrality makes rapid and even adjustment to the desired pH difficult. Thus, adjustment of the pH necessitates stirring an alkali into a relatively thick, viscous isolate curd. Moreover, dilution of the alkali is generally necessary to prevent formation of excessively alkaline areas or hot spots in the curd which can result in degradation of certain amino acids. Dilution of the alkali is also disadvantageous in that the isolate requires greater drying capacity.

It is a major object of this invention to provide a new and improved process for producing soy protein isolate of reduced viscosity.

It is a further object of this invention to provide a process for producing soy protein isolate in high yield from soy protein materials.

According to the present invention, isoelectrically precipitated soy isolate is treated with a plant protease at a temperature of 70° to 85° C. to accomplish thinning or reduction of viscosity. In a process where the precipitated protein is then treated with an alkali to resolubilize the protein, treatment with the plant protease is preferably accomplished prior to or simultaneously with the resolubilization pH adjustment.

In accordance with one preferred embodiment of the invention, a high purity soy protein isolate is obtained from a soy protein containing material by the process which comprises:

(1) forming an aqueous slurry of a soy protein material at a pH of from about 5.7 to 7.5, (2) subjecting the aqueous slurry to an elevated temperature and physical agitation, (3) subjecting the cooked slurry to a separation process such as centrifugation to separate solids from the liquid, (4) isoelectrically precipitating soy isolate from the liquid extract from the separation procedure, (5) adjusting the pH of an aqueous slurry of the precipitated soy isolate to 5.7 to 7.5 while treating the precipitated soy isolate with, or after treating the precipitated soy isolate with, a plant protease enzyme at a temperature of about 70° C. to 85° C., (6) inactivating the plant protease enzyme, and (7) recovering a thinned soy isolate.

According to the above preferred embodiment, in Step 1 an aqueous slurry of a soy protein-containing material is slurried in water with the solids content of the slurry ranging from about 5 to 15% by weight. The soy protein-containing material can be soybean flakes, flour or concentrate and the like.

The pH of the protein-containing slurry is adjusted to within the range of about 5.7 to 7.5 and is then subjected to elevated temperatures on the order of 250° to 300° F. accompanied by dynamic working as described, for example, in U.S. Pat. No. 3,849,391. A particularly preferred procedure is to subject the protein slurry to heat in a jet cooker which is a device commonly used in the starch industry for cooking starches. In such cookers steam is directed into the flow path of the protein-containing slurry. The steam and the slurry are intimately mixed and dynamically worked and then forced through one or more jet nozzle orifices to shear the protein and cause disruption thereof. Generally, exposure of the protein slurry to heat and shear in a jet cooker is conducted for short periods of from about 1 to 10 minutes and preferably from about 3 to 5 minutes.

Following the jet cooking or other heating, the fibrous material is separated by filtration or centrifugation and then the pH of the protein-containing slurry is adjusted to the isoelectric pH of 4.5 to 5.0 to precipitate soy isolate. The precipitated soy isolate is separated from the carbohydrate components in solution in the whey by filtration or centrifugation and washed. The pH of the washed isolate is adjusted upwardly to 5.7 to 7.5 to resolubilize the protein by mixing sodium hydroxide or similar alkali therewith. Either prior to or during the pH adjustment, the isolate is treated at a temperature of 70°–85° C. with a plant protease to cause thinning and to facilitate adjustment of the pH. Treatment with the enzyme at this point is very advantageous in that it significantly reduces the viscosity of the isolate curd and permits handling of higher solids levels and easier pH adjustment at a given solids level at the stage of maximum viscosity in the isoelectric separation process. In a less preferred embodiment, treatment with the plant protease can be conducted after the pH adjustment. However, in this instance the important advantages of pH adjustment facilitation as discussed above are not realized but other benefits of treating with the plant protease are, namely, reducing the viscosity of the isolate at this stage permits further processing of higher solids level slurries.

The plant protease enzyme can be, for example, papain, bromelain, ficin or a protease from the chaya or agave plants and the like. Treatment with about 0.005% to 0.4%, on dry solids, preferably 0.1% to 0.2% on dry solids, of the plant protease for a short period, generally from 1 to 5 minutes, is sufficient to achieve the desired thinning or viscosity reductions.

Thereafter, inactivation of the enzyme is conducted by heating the treated isolate to a temperature above about 90° C. for a short period on the order of 4 to 10 minutes.

The resulting soy isolate product is then ready for use to form liquid milk-type products or it can be dried in any convenient manner, such as spray drying. The soy isolate so produced has reduced viscosity in liquid solutions, does not gel, is not bitter and has good solubility. Optionally, the soy isolate product can be subjected to a further heat treatment to achieve sterilization. The enzyme inactivation and the optional sterilization treatment can both be advantageously effected using a jet cooker.

The advantages of the invention are further apparent from the following specific examples.

EXAMPLE 1

An aqueous slurry of soy flakes is treated in a jet cooker at a pH of about 6.8 and a temperature of 275° F. for 4 minutes. The jet cooked slurry is centrifuged and the separated extract treated with an acid to adjust the pH to the isoelectric pH (pH 4.5 to 5.0) so as to precipitate a protein isolate. The precipitated curd is washed, centrifuged and reslurried. The washed isoelectric precipitate or curd and papain, at a rate of 0.23 grams of enzyme per pound of precipitate, 0.5% on dry solids, are continuously introduced into a pH adjust tank maintained at a temperature of 70°–75° C. Caustic is simultaneously and continuously introduced into the pH adjust tank to adjust the pH of the curd being added from 4.5 to 5.0 up to about 7.0 to 7.5. The viscosity of the papain-thinned isolate as it exits the pH adjust tank after the enzymatic treatment is about 139–251 centipoises (RV Brookfield, speed 100, spindle 3, at 70° C.) compared to 630 centipoises (RV Brookfield, speed 100, spindle 3, at 70° C.) for a similarly prepared isolate to which no enzyme was added.

EXAMPLE 2

A protein isolate (i.e., an isoelectric protein precipitate) prepared as in Example 1 was adjusted to one of several pH values as shown below and treated (in batch) at 75° C. with 0.05% papain (on dry solids basis). Both enzyme-treated and control samples (not enzyme-treated) were heated to 90° C. and held for 5 minutes before adjusting the pH to 7.0 and the temperature to 40° C. for the measurement of viscosity on an RV Brookfield Viscosimeter. The results were as follows:

| Isolate | Brookfield Viscosity 40° C., pH 7.0 | | | |
|---|---|---|---|---|
| | pH | Spindle | Speed | cps |
| Papain | 7.4 | 1 | 100 | 59 |
| | 6.4 | 1 | 100 | 45 |
| | 5.6 | 2 | 100 | 103 |
| | 4.9 | 2 | 100 | 99 |
| Control | 6.4 | 6 | 100 | 2517 |
| | 5.6 | 6 | 100 | 2457 |
| | 4.9 | 5 | 100 | 1661 |

The above data show that the enzyme effectively reduced the isolate viscosity over a broad pH range.

EXAMPLE 3

This example shows the utility of the enzyme-thinned isolate as a vehicle for the incorporation of untreated, spray dried isolate for the purpose of increasing solids for spray drying.

Two 6-liter samples of isolate were prepared as follows: Defatted soy flakes were jet cooked and the insoluble portion removed by centrifugation. The extract was adjusted with hydrochloric acid to pH 4.5 and centrifuged. The isoelectrically precipitated protein curd was washed, reslurried and adjusted to pH 7.2. Sample #1 was thinned with 0.05% papain (on dry solids) at 75° C. for 5 minutes. The papain was not inactivated. Spray dried isolate (pH 7.2) as prepared in a commercial process was added in respective supplements and the viscosity determined at the resultant solids levels.

Sample #2 (control) was similarly treated without the addition of papain. The viscosities as shown below were measured on an RV Brookfield Viscosimeter at 60° C., speed 100, with various spindles.

| Sample | % Dry Solids | Viscosity (cps) |
|---|---|---|
| 1. Papain-treated | 8.9 | 44 |
| | 11.9 | 194 |
| | 12.9 | 297 |
| | 13.7 | 501 |
| | 14.4 | 715 |
| | 16.0 | 807 |
| | 16.5 | 1197 |
| 2. Control | 10.4 | 1203 |
| | 11.9 | 1295 |
| | 12.8 | 2064 |
| | 13.4 | 2739 |

As seen above, treatment with papain resulted in significantly lower viscosity readings at any given solids levels. Lower viscosity permits handling of an isolate stream with a higher level of dissolved solids in conventional equipment.

EXAMPLE 4

The use of the present invention to permit processing of a higher solids stream at a given viscosity is illustrated in this example. An isoelectrically precipitated soy isolate was continuously produced as in Example 1 and adjusted to pH 7.3. This control isolate (Sample #1) had a viscosity of 630 centipoises at 8.7% dry solids (see below). The control isolate (Sample #2) was then continuously thinned with 0.08% papain (on dry solids) at 70°–75° C. to yield a viscosity of 223 centipoises at 9.3% dry solids (see below). Spray dried isolate was then added to Sample #2 to increase the dry solids and, correspondingly, the viscosity to equal that of the unthinned control. The thinned isolate could be handled at 13.0% dry solids without exceeding the viscosity of the 8.7% dry solids control.

| Sample | % Dry Solids | Spindle # | RV Brookfield Viscosity (at 70° C.) | |
|---|---|---|---|---|
| | | | Speed | Viscosity (cps) |
| 1. Control | 8.7 | 3 | 100 | 630 |
| 2. Papain Thinned | 9.3 | 2 | 100 | 223 |
| " | 13.0 | 3 | 100 | 570 |

EXAMPLE 5

Several enzymes were compared for ability to thin soy isolate at a dry solids level of 10%. A sample of isoelectrically precipitated soy protein isolate prepared as in Example 1 (pH 7.4) was treated for 5 minutes at 75° C. with 0.05% (on dry solids) of one of the enzymes below. Enzyme-treated isolates were heated to 90° C. to inactivate the enzyme. Only the plant proteases thinned isolate at this relatively high temperature.

| Enzyme | RV Brookfield Viscosity, 62° C. | | | Flavor |
| --- | --- | --- | --- | --- |
| | Spindle | Speed, rpm | cps | |
| Papain | 1 | 100 | 33 | bland |
| Bromelain | 1 | 100 | 34 | bland |
| Ficin | 1 | 100 | 155 | bland |
| Neutrase | 4 | 100 | 971 | bland |
| Acid Fungal Protease | 4 | 100 | 628 | bland |
| Trypsin | 4 | 100 | 608 | bitter |
| No Enzyme | 4 | 100 | 756 | bland |

EXAMPLE 6

A papain-thinned isoelectrically precipitated soy protein isolate prepared as in Example 1 and spray dried was incorporated into the following simulated milk formula:

7.0 grams Isolate
8.0 grams Sanacreme D (dry fat)
5.2 grams Maltrin M-100
0.6 gram Sucrose
150 milliliters water The product containing the papain-thinned isolate was judged to have better mouthfeel and flavor than a similar product containing a similarly prepared control soy protein isolate not treated with enzyme. There was no thickening or settling in the product containing the enzyme treated isolate, whereas the product containing the control isolate (no enzyme treatment) showed a layer settling out after storage overnight in a refrigerator.

The advantages of the present invention are numerous and apparent. The invention makes it possible to produce a high quality soy protein isolate with reduced viscosity. Higher solids level of protein can be easily handled in processing and the high viscosities associated with adjusting the isoelectric curd to neutrality with caustic are avoided. Moreover, drying requirements are reduced since it is not necessary to use highly diluted alkali solutions to raise the pH of the precipitated protein isolate so as to resolubilize the protein. This benefit reduces the amount of water that must be removed during drying and lowers nitrate and nitrite levels of the final product by reducing residence time in the drier. The process is amenable to continuous operation with optimum yield of protein of high quality.

Those modifications and equivalents which fall within the spirit of the invention are to be considered a part thereof.

What is claimed is:

1. A process for producing a soy protein which comprises:
    forming an aqueous slurry of a soy protein material at a pH of from about 5.7 to 7.5,
    subjecting the aqueous slurry to an elevated temperature and physical working,
    separating solids from the heated and worked slurry,
    isoelectrically precipitating soy isolate from the heated and worked liquid material,
    adjusting the pH of the precipitated material to 5.0–7.5 before, after, or while, treating the precipitated soy isolate with a plant protease enzyme at a temperature of about 70° C. to 85° C. for a period of not more than about 5 minutes to reduce the viscosity thereof, and
    then inactivating the plant protease enzyme and recovering a thinned soy isolate.

2. A process according to claim 1 wherein inactivation of the protease is accomplished by heating.

3. A process according to claim 1 wherein the aqueous slurry is subjected to an elevated temperature and physical working in a jet cooker.

4. A process according to claim 1 wherein the pH of the precipitated soy isolate is adjusted upwardly from the isoelectric pH to not above 7.5 after or while being treated with a plant protease enzyme.

5. A process according to claim 1 wherein the pH of the soy isolate is adjusted to a pH in the range of 7.0 to 7.5 after or while being treated with a plant protease enzyme.

6. A process according to claim 1 wherein after treatment with a plant protease the soy isolate is subjected to heat sterilization.

7. A process according to claim 1 wherein the thinned soy isolate is dried.

8. A process according to claim 1 wherein the plant protease is papain.

9. A process according to claim 1 wherein the plant protease is bromelain.

10. A process according to claim 1 wherein the plant protease is ficin.

11. A process according to claim 1 wherein the plant protease is one from the chaya or agave plant.

* * * * *